United States Patent Office 2,829,762
Patented Apr. 8, 1958

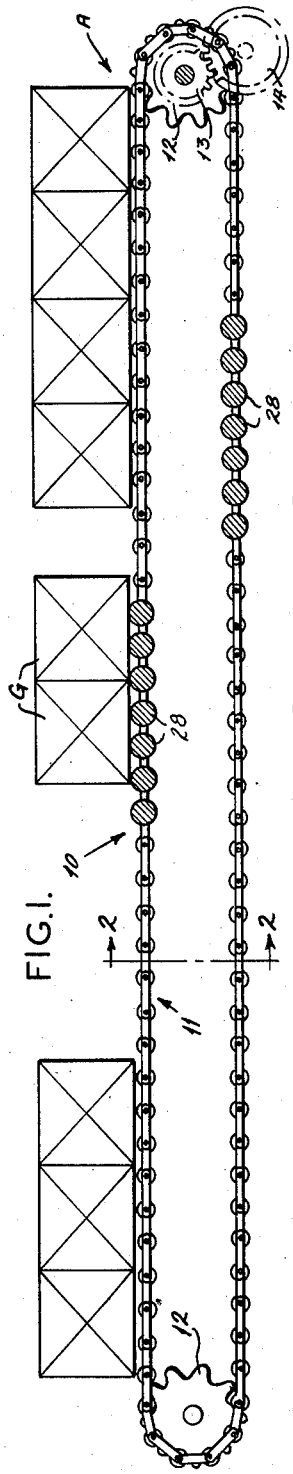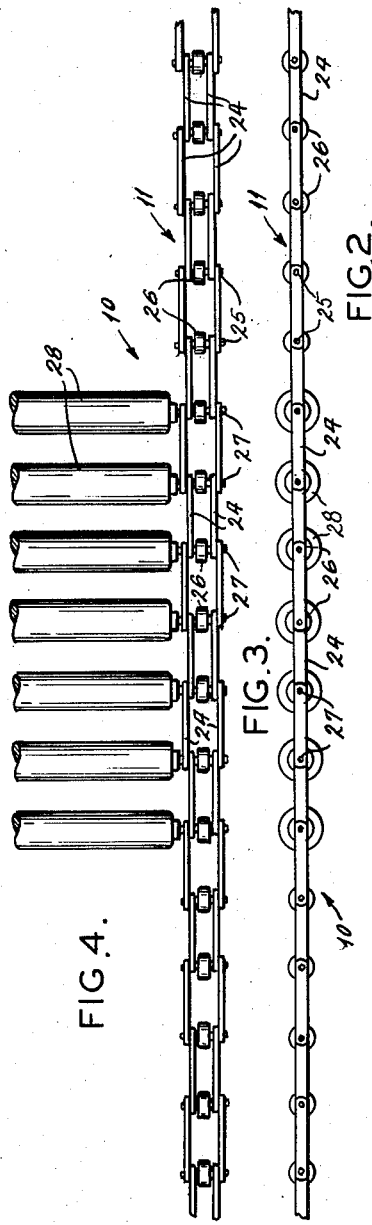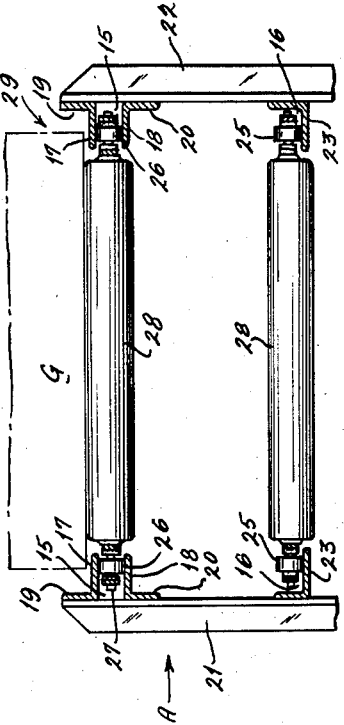

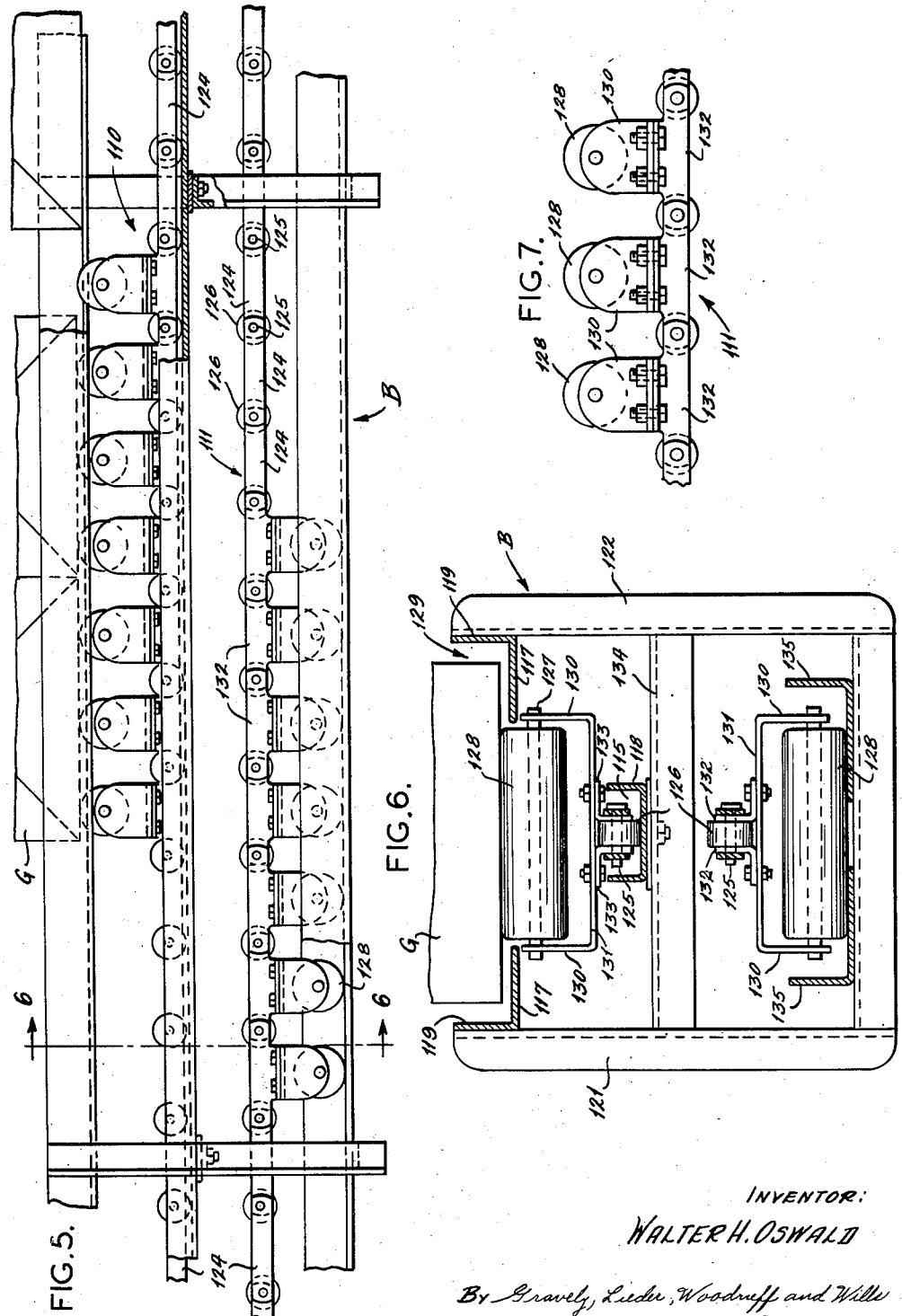

2,829,762

LIVE CONVEYOR

Walter H. Oswald, St. Louis, Mo., assignor to Alvey Conveyor Manufacturing Company, St. Louis, Mo., a corporation of Missouri Application January 16, 1956, Serial No. 559,327

8 Claims. (Cl. 198—183)

The present invention relates generally to live conveyors and to improvements in arrangement and operation thereof for storing and periodically feeding articles.

It is an object of the present invention to provide a live conveyor having a movable load supporting platform for periodically advancing one or more articles along a conveyor bed between work stations.

Another object of the present invention is to provide a live conveyor on which articles being conveyed may be temporarily stored with minimum effort and without shutting off the conveyor.

Another object of the present invention is to provide a live conveyor having a load supporting platform of rotatable elements that moves beneath articles temporarily supported thereon with minimum resistance and advances only the forward most article or articles during each conveying cycle.

Another object of the invention is to provide a live conveyor having a continuously moving load supporting platform that produces periodic movement of the articles being conveyed thereby.

Still another object of the invention is to provide an inexpensive live conveyor having extensive duplication of easy to replace components providing maximum flexibility with minimum down time for repairs and changes.

Briefly, the present invention comprises a live conveyor having a stationary load supporting platform and a movable load supporting platform comprising a group of elements, preferably free turning elements, which movable load supporting platform periodically raises and advances articles positioned on the stationary platform and deposits the articles on the stationary platform at a more advanced location down the conveyor.

Other objects and advantages of the invention will become apparent hereinafter in the description and in the accompanying drawings which form a part thereof.

In the drawings:

Fig. 1 is a side-elevational view, partly in section, showing the live portion of a conveyor constructed according to the teachings of the present invention.

Fig. 2 is a cross-sectional view of the live conveyor taken along the line 2—2 of Fig. 1 and showing the live and stationary portions thereof, Fig. 3 is an enlarged fragmentary side-elevational view of the live portion of the conveyor shown in Fig. 1, Fig. 4 is a top fragmentary view showing the roller arrangement of the live portion of the conveyor of Fig. 3, Fig. 5 is a fragmentary side-elevational view of a variation of the live conveyor of Fig. 1, Fig. 6 is a cross-sectional view of the live conveyor of Fig. 5 taken along the line 6—6 thereof, and Fig. 7 is an enlarged fragmentary side elevational view of a segment of the live portion of the conveyor of Fig. 5.

Referring to the drawings in detail, the number 10 in Figs. 1, 3 and 4 refers to a live portion of a conveyor A constructed according to the teachings of the present invention. The live portion 10 includes two parallel continuous link and roller chains 11 which extend around sprocket wheels 12 that are rotatably mounted at the ends of the conveyor A. The sprocket wheels 12 at one end of the conveyor are operatively connected to drive means, shown in part as cooperating gears 13 and 14. During operation of the conveyor the link chains 11 are continuously driven in the same direction around the sprocket wheels 12 and provide the drive for the movable or live portion 10 of the conveyor A.

The link chains 11 move between the sprocket wheels 12 on upper and lower stationary tracks 15 and 16 (Fig. 2). The upper span of the chains 11 moves in the tracks 15 defined between horizontal portions 17 and 18 respectively of angles 19 and 20. The angles 19 and 20 have their vertical portions welded or otherwise fastened to upright support members 21 and 22 that are supported from a floor, ceiling, or wall to which the conveyor is mounted.

The lower stationary track 16 includes a single angle on each side having horizontal support portions 23 for the chains 11. These angles are fastened to the support members 21 and 22 on each side of the bed (Fig. 2) and provide the return path of the continuous chains 11. The continuous link chains 11 are shown in greater detail in Figs. 3 and 4. Each of the chains 11 is flexible and includes interconnected link members 24 which are journaled together on shafts 25 at each of the ends thereof. Between the link members 24 on the chains 11 are free turning rollers 26 which are journaled onto the shafts 25 and which project above and below the link members 24 for engaging the tracks 15 and 16. The rollers 26 are just large enough to freely pass along the upper track between the horizontal portions 17 and 18.

At intervals along the link chains 11 the shafts 25 are replaced by longer shafts 27 that extend between the chains 11 connecting them together. The shafts 27 are connected to the chains in the same manner as the shafts 25 and carry rollers 26 between the chain links 24 in the same way as the rest of the chains 11. In addition, the shafts 27 carry larger rotatable elements 28 between the chains 11 that are large enough so that their upper surfaces extend above the level of the portions 17 when the chains 11 are positioned in the upper track 15. The rotatable elements 28 provide a movable load supporting platform for articles G being conveyed. In the usual situation the rotatable elements 28 are arranged in groups at different locations along the length of the live portion 10. The number of the rotatable elements 28 in any one group depends on how many articles G it is desired to carry at one time and on the size of the individual articles. If only a few of the rotatable elements 28 are provided in each group then one or a small number of articles will advance for each pass of the group of elements 28 which make up the movable platform. Conversely, if the groups of the rollers 28 are large, many articles may be advanced for each pass.

During the time when articles are not moving, they rest on a stationary platform or shelf 29 defined along the sides and bottom by the upper most angles 19 (Fig. 2). The vertical portions of the angles 19 function as guides to keep the articles being conveyed on the track and in position to always be resting either on the stationary platform 29 or the rotatable elements 28, and the horizontal portions 17 support the articles when they are not being moved.

*Operation*

The conveyor is operated by driving the sprocket wheels 12 at one end of the conveyor in the desired direction. As the sprocket wheels 12 rotate, the upper span of the chains 11, including the movable platform of rotatable elements 28, moves in the desired direction of conveying along the upper track 15.

The present conveyor is particularly suitable for temporarily storing articles being conveyed. If, for example, as often times occurs in a production line, the persons taking articles off of the end of a conveyor run out of packing cases, it usually necessitates stopping the conveyor until fresh cases can be obtained. This results in shutting off the whole conveyor and idling workers at all stations. A conveyor constructed according to the present invention eliminates this lost time by enabling the packer to temporarily store articles on the conveyor using a minimum of effort. This is possible because the rotatable elements 28 which make up the movable platform are able to easily move under articles supported thereon when the articles are held back. When articles are not intentionally held back the movable platform moves under all but the forward most article or articles because of the retarding force of the forward articles with the stationary platform. The same principle applies anywhere along the conveyor.

Once a group of articles accumulates along the conveyor the movable platform of the rotatable elements 28 engages the rear of the group elevating and moving under the articles in succession from rear to front. When the movable platform is only under the forward most article or articles, there is no longer a retarding force between more advanced articles and the stationary platform and the articles then resting on the elements 28 are advanced until another group of articles is encountered or until they reach their destination along the conveyor. If another group of articles is encountered the process is repeated and again the forward most articles of that group are advanced to the next forward group down the conveyor.

The advantages of using a live conveyor of the type described is the ability of such a conveyor to operate continuously even during intervals when the work being done on the articles requires more time to complete at some stations along the conveyor than at others and consequently, build-ups occur. Normally such build-ups create bottlenecks that necessitate the shutting down of the conveyor. With the present conveyor build-ups may result at certain locations without any interruption of the conveyor operation. An article may even be easily retarded on conveyor A by applying a retarding force to the article as the movable platform passes.

A variation of the live conveyor A of Fig. 1 is shown in Figs. 5, 6 and 7 and is referred to by the letter B. The principal difference between conveyors A and B is in the drive mechanism. Live conveyor B uses a single link chain 111 instead of the two parallel link chains 11 in conveyor A. In the description which follows the parts in conveyor B equivalent to parts in conveyor A, as far as possible, will be designated by the same reference numerals increased by 100.

Fig. 6 shows two parallel angles 119 fastened to vertical supporting members 121 and 122. The horizontal portions 117 of the angles 119 provide a stationary load supporting platform or shelf 129 along which the articles G being conveyed move. The vertical portions of the angles 119 define the edges of the conveying platform 129. In the space between the angles 119, the rotatable elements 128 are shown projecting above the level of the stationary platform 129.

The rotatable elements 128 are free turning on shafts 127 which are supported near their ends in flanges 130 which are parts of bracket numbers 131. One of the bracket members 131 is provided for each of the rotatable elements 128 and the brackets 131 are fastened to links 132 of the link chain 111 by right angle portions 133 thereof (Fig. 6). The link chain 111 is similar to link chain 11 in conveyor A except for the provision included for supporting the elements 128. At locations not provided with elements 128 the chain 111 is the same as the chains 11, being provided with links 124, shafts 125 and rollers 126 (Fig. 5).

Across the upper span of live portion 110 the rollers 126 ride in a track 115 formed by an upwardly opening channel 118. The channel 118 is supported between the upper and lower span of the chain 111 (Fig. 6) by cross members 134 that are attached to the support members 121 and 122.

The rotatable elements 128 on the lower span of the link chain 111 move along another channel defined by angles 135. The angles 135 provide a path on which the rotatable elements 128 move during the return part of the cycle. At ends of the conveyor B suitable sprocket wheels and drive means (not shown) are provided for driving the live portion 110.

Fig. 7 shows three links of the chain 111 that carry the rotatable elements 128. Portions of the chain 111 that do not carry elements 128 are shown in Fig. 5. The chain 111, like the chains 11 in conveyor A, may have long intervals where there are none of the elements 128, or the groupings of the elements 128 may be close together depending on the requirements of a particular application. The elements 128 may also be arranged in large or small groups depending on how many articles are to be moved at one time.

By properly adjusting the tension on the link chain 111, and by providing sufficient running clearance between the ends of the rotatable elements 128 and the horizontal portions 117 of the angles 119, the tendency of the elements 128 to cant or drag is eliminated. If the articles being conveyed have flat bottoms, as for example packing cases, etc., there will also be a self leveling effect caused by the cartons extending sidewise beyond the ends of the elements 128 and over the portions 117.

The operation of conveyor B is generally the same as for conveyor A, the principal difference being the provision for only one chain 111 instead of two and in the particular construction of the member elements.

It is now apparent that there has been provided a novel live conveyor, which fulfills all of the objects and advantages sought therefor.

The foregoing description and accompanying drawings have been presented only by way of illustration and example, and changes and alterations in this disclosure which will be readily apparent to one skilled in the art, are contemplated as within the scope of the present invention which is limited only by the claims which follow.

What I claim is:

1. A live conveyor comprising a stationary conveyor bed and a movable conveyor platform of freely turning elements movable along a path defined in the stationary bed, said platform including a plurality of spaced freely turning elements which project above the conveyor bed and which are adapted to roll under an article resting on the stationary conveyor bed, the article being raised thereby above the stationary bed onto the projecting elements of said movable platform and conveyed therewith in the raised position relative to the stationary bed, said projecting elements in raising the article causing the standing friction between the article and stationary conveyor bed to be reduced to friction of the freely turning character of said projecting elements whereby the articles move with the platform so long as the conveyor path is free of obstruction tending to restore the standing friction.

2. A live conveyor for moving articles which are unopposed by retarding forces, comprising a stationary track upon which articles are supported preparatory to being moved, and a movable platform of spaced freely turning rollers movable along the stationary track, said freely turning rollers being of such size as to roll while passing under and elevating articles relative to the stationary track, and said rollers stopping rolling relative to the elevated articles and effecting article conveyancing upon overcoming the frictional resistance to movement incurred by the articles on said stationary track.

3. A live storage conveyor on which articles can be retarded with minimum retarding force comprising a stationary conveyor track on which articles are temporarily stored pending conveyance, a platform formed of spaced rotatable elements movable along a path in the stationary track, said rotatable elements rolling under the retarded articles on the track and said rotatable elements rolling under, elevating and moving unretarded articles relative to the stationary track.

4. In a conveying system for moving articles which are unopposed by retarding forces capable of resisting the conveying effort of the system, the improvement of a stationary conveying track including fixed means upon which articles are normally stationarily supported and from which they are elevated preparatory to being moved, and conveying means movable along the conveying track in a path adjacent said fixed means and below the articles, said conveying means including roller means of such size as to roll under and elevate the articles relative to the fixed means of said stationary track, said roller means being adapted, in moving along said stationary track, to stop rolling under and relative to the elevated articles upon stationary inertia of the articles being overcome and to effect article conveyance.

5. A live conveyor comprising a stationary and a movable load supporting platform for alternately supporting articles being conveyed, said stationary platform including longitudinal spaced shelf members, and said movable platform including transverse spaced rotatable elements positioned for longitudinal movement between said stationary shelf members and extending thereabove, said rotatable elements adapted to roll under articles supported on the stationary platform which are opposed by a retarding force, and said rotatable elements adapted to roll to positions under unretarded articles and then stop rolling and move the unretarded articles therewith along the stationary platform, and drive means for the movable platform including a continuous flexible chain operatively connected to said rotatable elements.

6. A live conveyor comprising a stationary and a movable load supporting platform; said stationary platform including parallel walls and shelf members defining the boundaries thereof, said walls serving to guide articles being conveyed along the stationary conveyor platform and said shelf members supporting the articles thereon between said walls; said movable load supporting platform including a group of spaced rotatable elements extending transversely across said stationary platform and projecting above the stationary platform; and drive means including at least one continuously moving flexible chain operatively connected to said movable platform for effecting longitudinal movement of the spaced rotatable elements in the conveying direction, said rotatable elements rolling under retarded articles on the stationary platform, and said rotatable elements rolling to a position under unretarded articles on the stationary platform and thereby elevating and conveying the unretarded articles therewith along the stationary platform.

7. A live conveyor comprising a stationary load supporting track having spaced guide members on which articles are supported and along which articles move, a movable platform supported by said guide members and including a group of spaced freely turning elements extending transversely between the spaced guide members and extending above said guide members, and drive means for the movable platform for moving said elements along the track whereby said elements engage and move under articles supported on the track whereby the articles are raised and conveyed therewith along the track in a forward direction.

8. A live conveyor comprising a stationary load supporting track having spaced guide members on which groups of one or more articles are supported and along which the articles are conveyed, a movable platform supported by said guide members and including a group of spaced freely turning elements extending transversely between the spaced guide members and extending thereabove, and drive means for the movable platform including a flexible chain operatively connected to said freely turning elements for moving said elements along the track, said elements engaging and moving under the articles in each group on the stationary track to overcome friction between the articles and the stationary track, said elements moving under, raising and conveying the forwardmost article in each group along the track.

References Cited in the file of this patent

UNITED STATES PATENTS

| 1,367,061 | Lewis | Feb. 1, 1921 |
| 1,761,199 | Drake | June 3, 1930 |
| 1,930,292 | Van Hooydonk | Oct. 10, 1933 |
| 2,257,230 | Drake | Sept. 30, 1941 |
| 2,641,351 | Riley | June 9, 1951 |

FOREIGN PATENTS

| 906,319 | Germany | Mar. 11, 1954 |